July 7, 1959     H. K. REID     2,893,939
CATHODIC PROTECTION SYSTEM
Filed Aug. 21, 1957
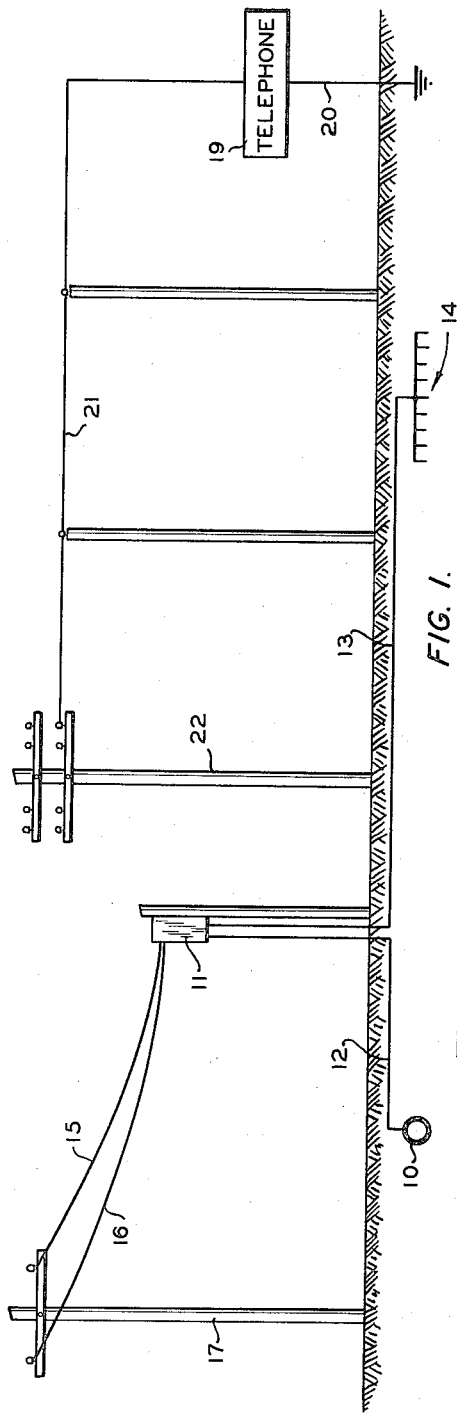
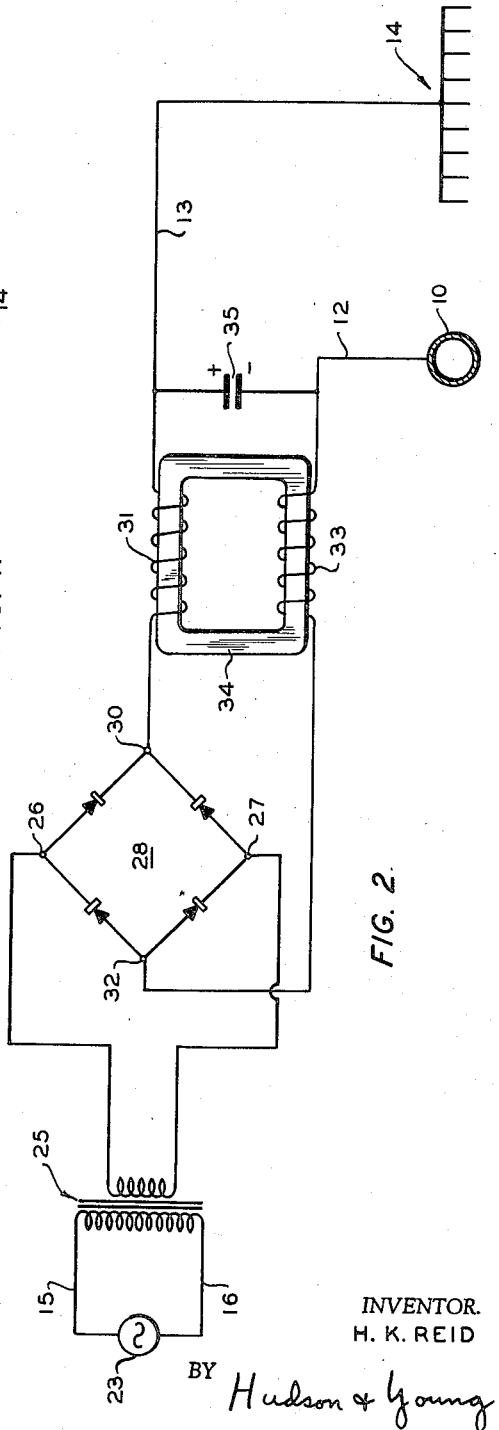
INVENTOR.
H. K. REID
BY Hudson & Young
ATTORNEYS United States Patent Office 2,893,939
Patented July 7, 1959

2,893,939
CATHODIC PROTECTION SYSTEM

Harvey K. Reid, Bartlesville, Okla., assignor to Phillips Petroleum Company, a corporation of Delaware Application August 21, 1957, Serial No. 679,415

2 Claims. (Cl. 204—196)

This invention relates to improved apparatus for protecting underground or buried metal structures from corrosion.

Various systems are known in the art for protecting metal structures, such as buried pipelines, from corrosion. One such system, identified as rectifier cathodic protection, mitigates electrolysis and galvanic corrosion of the pipeline by making the pipeline cathodic (negative) to the earth in which it is buried. The negative polarity on the pipeline is made possible by direct current from a rectifier which generally is energized from a commercially available 60-cycle alternating current source. The negative terminal of the rectifier is connected to the pipeline, and the positive rectifier terminal is connected to a ground bed system located a substantial distance from the pipeline. This type of cathodic protection system has been found to be quite successful in reducing corrosion in many locations. However, it has recently been discovered that protection devices of this type often result in interference to rural one-wire telephone systems. Telephone systems of this type have ground connections at the receiving stations. It has been found that telephone service often is disrupted if a grounded receiving station is located as close as 1,000 to 2,500 feet from a pipeline protection unit of the type described.

In accordance with the present invention, an improved cathodic protection system is provided which eliminates interference to nearby telephone lines. The positive output terminal of the rectifier is connected through a first choke coil winding to the ground bed system. The negative output terminal of the rectifier is connected through a second choke coil winding to the pipeline. The two choke coils are mounted on a common core, and an electrolytic capacitor is connected between the pipeline and the ground bed. It has been found that such a circuit effectively eliminates interference on nearby telephone systems.

Accordingly, it is an object of this invention to provide an improved cathodic protection system to prevent corrosion of metallic objects.

Another object is to provide apparatus for preventing interference between underground cathodic protection systems and nearby telephone lines.

Other objects, advantages and features of the invention should become apparent from the following detailed description which is taken in conjunction wtih the accompanying drawing in which:

Figure 1 is a schematic representation of a pipeline cathodic protection system located adjacent a telephone line.

Figure 2 is a schematic circuit drawing of the improved cathodic protection system of this invention.

Referring now to the drawing in detail, and to Figure 1 in particular, there is shown a cross-sectional view of an underground metal pipeline 10. The first output terminal of a rectifier unit 11 is connected to pipeline 10 by a lead 12. The second output terminal of the rectifier unit 11 is connected by a lead 13 to a grounded reference electrode assembly 14. Assembly 14 preferably comprises a plurality of graphite rods which are buried in the ground from about 150 to 400 feet from the pipeline, for example. Rectifier 11 is energized from a conventional source of 60-cycle current which is connected thereto by leads 15 and 16 that extend from a power line supported on a pole 17.

In some installations, the protection system necessarily is located near a grounded telephone receiver. This is illustrated in Figure 1 by a telephone 19 which is provided with a ground lead 20. Telephone 19 is connected by a wire 21 to the transmission wire on a telephone pole 22. One-wire telephone systems of this type are common in many rural areas of the country. Telephone 19 is considered to be located near the illustrated pipeline protection system.

The improved cathodic protection circuit of this invention is illustrated schematically in Figure 2. A source of alternating current 23 is connected by leads 15 and 16 to the primary winding of a transformer 25. The secondary winding of transformer 25 is connected across first opposite terminals 26 and 27 of a full wave rectifier bridge 28. The positive output terminal 30 of bridge network 28 is connected to the first terminal of a first choke coil 31. The second terminal of choke coil 31 is connected by lead 13 to electrode assembly 14. The negative output terminal 32 of bridge network 28 is connected to the first terminal of a second choke coil 33. The second terminal of choke coil 33 is connected by lead 12 to pipeline 10. Choke coils 31 and 33 are mounted on a common core 34 so that alternating current through either coil tends to eliminate the corresponding alternating current in the other coil. An electrolytic capacitor 35 is connected between leads 12 and 13.

In one specific embodiment of this invention, current source 23 provided electrical energy of 110 volts potential at a frequency of 60 cycle per second. Transformer 25 delivered an output voltage across bridge network 28 of approximately 24 volts. Choke coils 31 and 33 had inductances of about 0.002 henry each and capacitor 35 had a capacitance of about 2,000 microfarads. It has been found that this system eliminates interference on nearby telephone lines and is capable of operating satisfactorily over a substantial period of time.

It should thus be apparent that there is provided in accordance with this invention an improved circuit for use in cathodic protection systems which substantially eliminates interference between the protection systems and nearby grounded telephone lines. While the invention has been described in conjunction with a present preferred embodiment, it should be evident that it is not limited thereto.

What is claimed is:

1. A cathodic protection system for a buried pipeline located in close proximity to a one-wire telephone system comprising an electrode buried in the ground adjacent the pipeline to be protected, a source of alternating current, a voltage step-down transformer, means connecting said source of alternating current to the primary winding of said transformer, a full wave rectifier, means connecting the secondary winding of said transformer to the input of said rectifier, a closed loop of magnetic material, first and second coils mounted on said closed loop, means connecting the first terminals of said first and second coils to the positive and negative output terminals of said rectifier, respectively, means connecting the second terminal of said first coil to said electrode, means connecting the second terminal of said second coil to the pipe to be protected, and an electrolytic capacitor connected between the second terminals of said first and second coils.

2. The system of claim 1 wherein the potential across the secondary winding of said transformer is about 24 volts, said coils each have an inductance of about 0.002 henry, and said capacitor has a capacitance of about 2,000 microfarads.

References Cited in the file of this patent

UNITED STATES PATENTS

| | | |
|---|---|---|
| Re. 20,078 | Kaehni et al. | Aug. 25, 1936 |
| 1,736,987 | Thalhofer | Nov. 26, 1929 |
| 1,788,342 | Miessner | Jan. 6, 1931 |
| 1,840,776 | Houck | Jan. 12, 1932 |
| 2,676,295 | Douma | Apr. 20, 1954 |
| 2,700,649 | Hosford | Jan. 25, 1955 |

FOREIGN PATENTS

| | | |
|---|---|---|
| 36,813 | Denmark | Oct. 28, 1925 |
| 382,809 | Great Britain | Nov. 3, 1932 |
| 1,007,762 | France | Feb. 13, 1952 |